US007082137B2

(12) United States Patent
Sestito et al.

(10) Patent No.: US 7,082,137 B2
(45) Date of Patent: Jul. 25, 2006

(54) METHOD OF MANAGING TIME-SLOT INTERCHANGE IN TRANSOCEANIC MS-SPRING NETWORKS

(75) Inventors: Vincenzo Sestito, Milan (IT); Andrea Mazzini, Pessano con Bornago (IT); Giuseppa Licata, Segrate (IT)

(73) Assignee: Alcatel, Paris (FR)

( * ) Notice: Subject to any disclaimer, the term of this patent is extended or adjusted under 35 U.S.C. 154(b) by 927 days.

(21) Appl. No.: 09/918,505

(22) Filed: Aug. 1, 2001

(65) Prior Publication Data
US 2002/0024961 A1    Feb. 28, 2002

(30) Foreign Application Priority Data
Aug. 29, 2000    (IT)    .......................... MI2000A1918

(51) Int. Cl.
H04L 12/28    (2006.01)
(52) U.S. Cl. ...................................... 370/403; 370/228
(58) Field of Classification Search ........ 370/221–224, 370/376–377, 360, 329, 448
See application file for complete search history.

(56) References Cited
U.S. PATENT DOCUMENTS 5,469,428 A * 11/1995 Tokura et al. ............... 370/224
5,537,393 A * 7/1996 Shioda et al. ............... 370/223
5,745,476 A * 4/1998 Chaudhuri .................. 370/222
5,815,490 A * 9/1998 Lu .............................. 370/223
6,144,633 A * 11/2000 Ikeda et al. ................. 370/217
6,614,754 B1 * 9/2003 Usuba et al. ................ 370/222
6,728,205 B1 * 4/2004 Finn et al. ................... 370/217
6,751,189 B1 * 6/2004 Gullicksen et al. ......... 370/216
6,760,302 B1 * 7/2004 Ellinas et al. ............... 370/228
6,775,477 B1 * 8/2004 Badr ............................. 398/1
6,798,747 B1 * 9/2004 Watkins et al. ............. 370/238
6,839,514 B1 * 1/2005 Sharma et al. ................ 398/2

OTHER PUBLICATIONS

"Series G: Transmission Systems and Media, Digital Systems and Networks", ITU-T Standard, G.841, Oct. 1998.

* cited by examiner

Primary Examiner—Chau Nguyen
Assistant Examiner—Rhonda Murphy
(74) Attorney, Agent, or Firm—Sughrue Mion, PLLC (57) ABSTRACT A method of managing time slot interchange in transoceanic MS-SPRING networks. The method, in case of ring failure in a single span of the path installed in a transoceanic MS-SP RING with Time Slot Interchange (TSI) mechanism, comprises the step of carrying out a ring switch action by the MS-SP mechanism, and is characterized by comprising the step of re-routing the path in the time slot of the low-priority channels corresponding to the time slot of the high-priority channels of the failured span. The method according to the invention further provides for the managing of double-failure or multi-failure cases resulting in one or more nodes being isolated.

14 Claims, 10 Drawing Sheets

METHOD OF MANAGING TIME-SLOT INTERCHANGE IN TRANSOCEANIC MS-SPRING NETWORKS

INCORPORATION BY REFERENCE OF PRIORITY DOCUMENT

This application is based on, and claims the benefit of, Italian Patent Application No. MI2000A001918 filed on Aug. 29, 2000, which is incorporated by reference herein.

BACKGROUND OF THE INVENTION

1. Field of the Invention

The present invention relates to a method of managing changes of time-slot allocations in ring networks protected by a transoceanic MS-SPRING protection mechanism.

2. Description of the Prior Art

In SDH MS-SPRING (Multiplex Section Shared Protection Ring) networks, a shared protection mechanism is implemented, which mechanism allows for the automatic restoration of the traffic in case of defects or failures in the connection fibers. In other words, the MS shared protection ring networks perform the automatic restoration of the traffic through a synchronized re-routing of said traffic, performable at each node of the ring. This operation is controlled by a protocol consisting of messages that are continuously interchanged between adjacent nodes. Said protocol and the related operations are defined by several international standards issued by ANSI, ITU-T and ETSI and they are characterized by a set of rules and messages. See, for instance, Recommendation ITU-T G. 841.

Protection in an MS shared protection ring network is implemented according to a so-called Bridge and Switch technique that consists essentially in re-routing the traffic, by means of an appropriate modification in the internal connections of the network elements, switching it from the working capacity to the protection capacity. The protection in an MS shared protection ring network is a multiplex section-oriented protection mechanism, i.e. the events defining the traffic restoration and the hierarchy that regulates those events are given at multiplex section level. In the "classic" (or terrestrial) MS shared protection rings, in the event of a failure, the whole high-priority line capacity is re-routed by utilizing the corresponding low-priority line capacity; in the transoceanic MS shared protection rings, on the contrary, only the paths affected by a failure are selectively re-routed.

It is also known that the ring networks provide for a mechanisms termed "Time Slot Interchange", in short TSI. TSI means, for instance, that when traffic is configured in a given ring network, such a traffic, which is carried in the associated STM-n and hence in the AU-4 contained in the STM-n, is allowed to travel through a network element occupying different AU-4 numbers at the input and at the output. Consider for instance a maximum capacity of a four-fiber ring, composed of sixteen AU-4s. The TSI mechanism allows one to enter a network element (of pure transit and where no termination occurs) with AU-4#X from its West side (W) and to go out from its East side (E) with an AU-4#Y, where X≠Y=1, 2, . . . , 16. The advantage is a greater flexibility in the traffic allocation and a very efficient exploitation of the band.

At present, performing TSI in ring networks protected by an MS-SPRING protection mechanism is not known. In particular, it is not known to perform allocation changes in transoceanic MS shared protection ring networks.

SUMMARY OF THE INVENTION

Therefore, the main object of the present invention is to provide a method allowing the execution of allocation changes in transoceanic rings protected by an MS-SPRING mechanism. This and further objects are achieved by a method having the features set forth in independent claim 1 and a network element according to claim 8. The respective dependent claims define further advantageous characteristics of the invention itself. All the claims are intended to be an integral part of the present description.

The basic idea of the present invention consists substantially in protecting the high-priority traffic by assigning, in case of a ring failure, the low-priority channel time slots chosen according to the real failure location and to the instant at which such failure has occurred, with respect to other failures possibly already present.

The invention will certainly become clear in view of the following detailed description, given by way of a mere non limiting and exemplifying example.

BRIEF DESCRIPTION OF THE DRAWINGS

In the drawings:

FIG. 4 show the signaling that is received/generated by the single nodes and the corresponding actions performed in the event of simultaneous double failure;

FIG. 5 show the signaling that is received/generated by the single nodes and the corresponding actions performed in the event of nearly simultaneous double failure;

FIG. 6 show the signaling that is received/generated by the single nodes and the corresponding actions performed in the event of double failure at different times (first sub-scenario);

FIG. 7 show the signaling that is received/generated by the single nodes and the corresponding actions performed in the event of double failure at different times (second sub-scenario);

FIG. 8 show the signaling that is received/generated by the single nodes and the corresponding actions performed in the event of clearing of a first failure; and FIG. 9 show the signaling that is received/generated by the single nodes and the corresponding actions performed in the event of clearing of a second failure.

BEST MODE FOR CARRYING OUT THE INVENTION

In the various figures, a four-fiber transoceanic telecommunication ring has been always depicted. The two working fibers (otherwise known as "high-priority channels" or "HP channels") are indicated by solid-line arrows whereas the protection fibers (otherwise known as "low-priority channels" or "LP channels") are indicated by dashed-line arrows. Naturally, the present invention applies both to the illustrated case of bi-directional traffic and to the case of unidirectional traffic.

Moreover, the present invention is applicable also to rings in which the traffic subjected to TSI is configured with "channel concatenation (AU4)".

The ring illustrated to describe the invention comprises ten network elements or nodes, represented by blocks and designated by respective numerals (1 to 10). The West (W) and East (E) sides of each node are indicated. The term "span" is used throughout this description to mean that part between two adjacent nodes, for instance between nodes 1 and 2 or the one between nodes 7 and 8.

In the ring there are depicted, by way of a non-limiting example, two paths installed, "path (a)" and "path (b)". The first path (path a) is depicted by a bolt solid line whereas the second path (path b) is depicted by a bolt dotted line. Path (a) is inserted at node 2 and is dropped at node 8. Path (b) is inserted at node 4 and is dropped at node 9.

Finally, it has been tried to clearly indicate (with numbers after symbol "#") the various time slots in which the various paths are allocated, span by span. Thus it has been also indicated if a Time Slot Interchange (TSI) occurs at a node or if that node allows that path to transit without changing the AU-4 on which it is allocated.

The present invention contemplates the general criteria set forth below:

I) single failure: once a ring failure has occurred in a given span, a ring switch action is performed by the MS shared protection mechanism. This activity defines the set of re-routable paths, namely all the paths whose nominal route includes the failed span. According to the present invention, each of these paths is re-routed on the time slot of the low-priority (LP) channels corresponding to the time slot of the high-priority (HP) channels of the failed span. There is no risk of any conflict since the LP time-slot assignment criterion is the same for all the failed paths.

II) double failure: if a failure occurs at a further span and the path can still be saved, then II.I) i) the actual re-routing is released; ii) among the two failed spans one is chosen according to a certain criterion; and iii) the path is re-routed over the time slot of the low-priority (LP) channels corresponding to the time slot of the high-priority (HP) channels of the selected failed span. Should multiple (more than two) failures occur, the choice of the span to consider for the TSI path protection is to be made by selecting, according to the above criterion, among the spans adjacent to the switching nodes that are able to communicate with the termination nodes of the path to be protected. There is no risk of any conflict since the LP time-slot assignment criterion is the same for all the paths affected by the failure. In this way, any transient misconnection is avoided.

II.II) The actual re-routing is not released when the persistency of the re-routing information is supported by the ring network elements.

The procedures that are implemented by each node of the ring (in addition to the procedures already provided for by the MS shared protection mechanism) will be indicated below:

A. If, at both W and E sides of the node, two Bridge Requests with an "Idle" status code concerning the same span (single failure) are detected, then each path comprising the span in question is re-routed over the LP time slot equal to the HP time slot of the (sole) span affected by the failure. In other words, if the node is a path termination node (a node where the path to be re-routed is inserted or dropped), the Bridge & Switch action is performed by utilizing the LP time slot equal to the HP time slot of the span affected by the failure.

A1. If at W or E side of the node at least one Bridge Request with an "Idle" status code is detected, a pass-through is performed, if necessary, by utilizing the same LP time slot (LP time slot equal to the HP time slot of the span affected by the failure).

B. If at both W and E sides of the node Ridge Requests with a "Bridged and Switched" status code concerning different spans (multiple failures) are detected, then each path comprising the spans in question is re-routed over the LP time slot equal to the HP time slot of the span affected by the failure that has been chosen according to a fixed criterion. The criterion for selecting one among the failed spans could, for instance, be any one of the following:

a) the failed span adjacent to the switching node with higher (or lower) node identification is chosen;

b) the failed span adjacent to the switching node coming first (or last) in the ring map; or c) the failed span adjacent to the switching node that is "far West" or "far East" node in the ring.

Similarly to the above case A, if the node in question is a path termination node (node in which the path to be re-routed is inserted or dropped), the Bridge & Switch action is performed by utilizing the LP time slot equal to the HP time slot of the selected failed span.

B1. If at the W or E side of the node at least one Bridge Request with "Bridged and Switched" status code is detected, a pass-through is performed, if necessary, by utilizing the same LP time slot as above.

C. In an optimized embodiment, should a path re-routing due to single failure be under way, if at W and E sides of the node Bridge Requests with a different ("Idle" or "Bridged and Switched") status code that carry the indication of a second failure, hence located at a different span, are detected, then, for each path that has already been re-routed, it is evaluated if the new requests exhibit a failured state that requires to release or maintain the present re-routing. It is not necessary to release the actual re-routing of a single path in the following cases:

i) when a failure is detected in addition to the already existing failure/s (and such new failure/s does/do not result in the "isolation" condition of any of the termination nodes of the already protected path); or ii) when the last occurred span failure has been removed.

It is understood how the persistency of the path re-routing condition is strictly connected to the coexistence of the aforesaid triggers at both sides of the nodes. This behavior results in the correct re-routing of the failed paths, namely it prevents misconnections from being created during transient states of the ring protection mechanism.

Note that the above is applicable to the case of bidirectional path and unidirectional one not using the inverse route. Clearly, if two unidirectional paths are allocated on the same time slot (in opposite directions), then the same LP time slot can be assigned to both paths.

Figure 1:
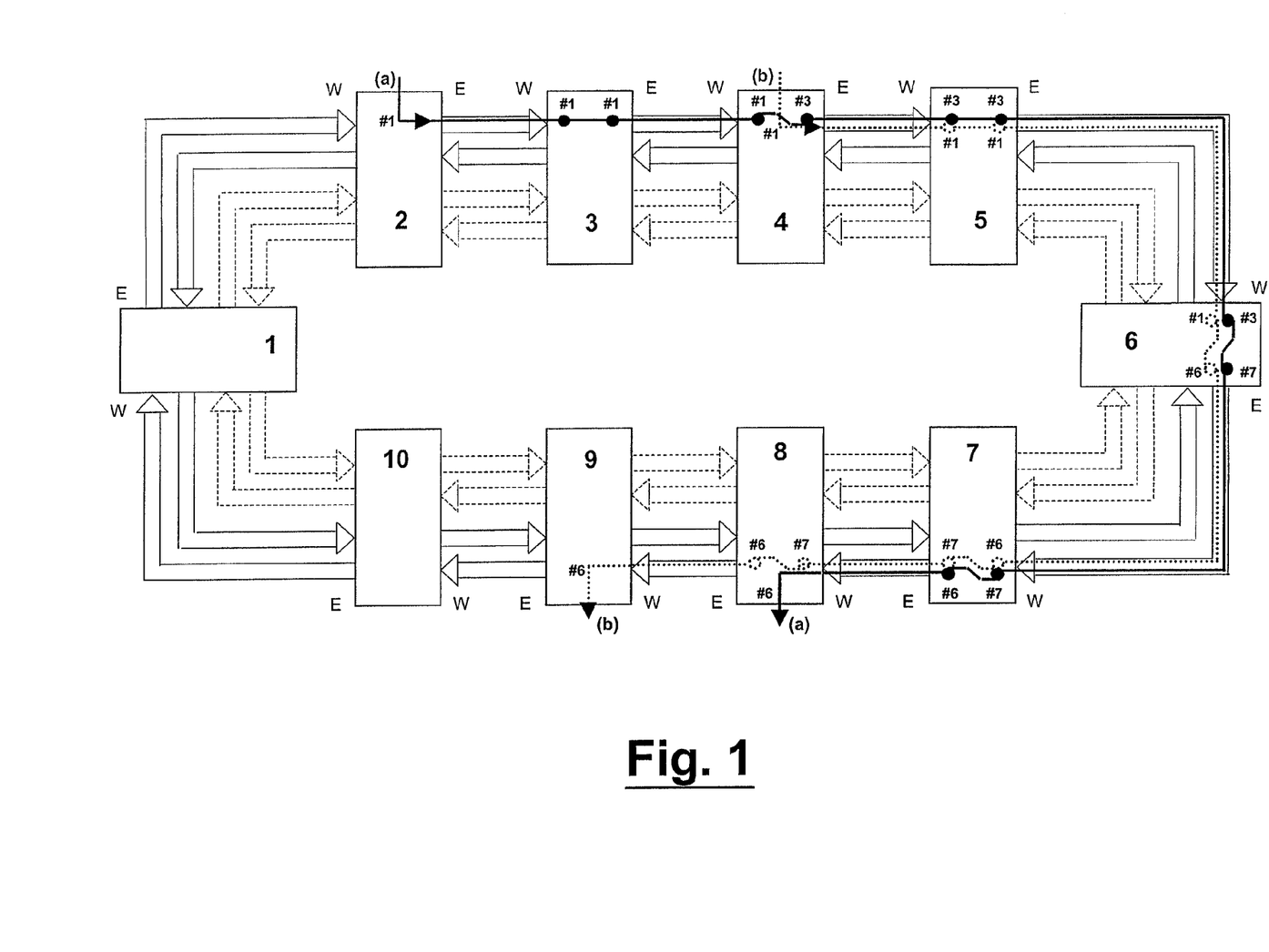
FIG. 1 shows a ring network in a stable faultless situation, the network having a plurality of nodes, two installed paths and some allocation changes.

FIG. 1 shows a transoceanic MS shared protection ring protected against failures in accordance with the invention, at some nodes of the ring Time-Slot Interchange (TSI) occurring. The installed paths are two: (a) and (b). Path (a) enters the ring at node 2 and is allocated on the AU-4#1; therefore, in span 2-3 the allocation is AU-4#1; at node 3 the allocation is unchanged (therefore it remains AU-4#1); at node 4, the allocation is changed from AU-4#1 to AU-4#3; in span 4-5 the allocation is therefore AU-4#3; at node 5 the allocation is not changed (therefore it remains AU-4#3); in span 5-6 the allocation is therefore AU-4#3; at node 6 the allocation is changed from AU-4#3 to AU-4#7; therefore, in span 6-7 the allocation is AU-4#7; at node 7 the allocation changes again from AU-4#7 to AU-4#6; therefore, in span 7-8 the allocation is AU-4#6;finally, path (a) is dropped at node 8. For path (b): it enters at node 4 and is allocated on AU-4#1; this allocation is maintained up to node 6 where it changes from AU-4#1 to AU-4#6; it is changed again at node 7 (passing from AU-4#6 to AU-4#7) and at node 8 (passing from AU-4#7 to AU-4#6). Finally, path (b) is dropped at node 9.

In the event of a ring failure (namely, a failure that makes both high-priority (HP) channels and low-priority (LP) channels useless), the present invention provides for a method of remedying such failure notwithstanding the presence of allocation changes in the ring. Reference should be made, for the event of single ring failure, to FIGS. 2 and 3 where a ring failure in the span 6-7 has been simulated.

As it is known, the management of failures in the synchronous (SDH or SONET) telecommunications networks occurs, for some protection types among which the MS-SPRING one, through bytes K1 and K2 of the frame overhead. Since the present invention does not concern specifically such bytes K1 and K2, a more precise description thereof will not be given, the reader having the possibility to refer to relevant Recommendations, for instance the ITU-T Recommendation G. 841, incorporated herein by reference.

Figure 2:
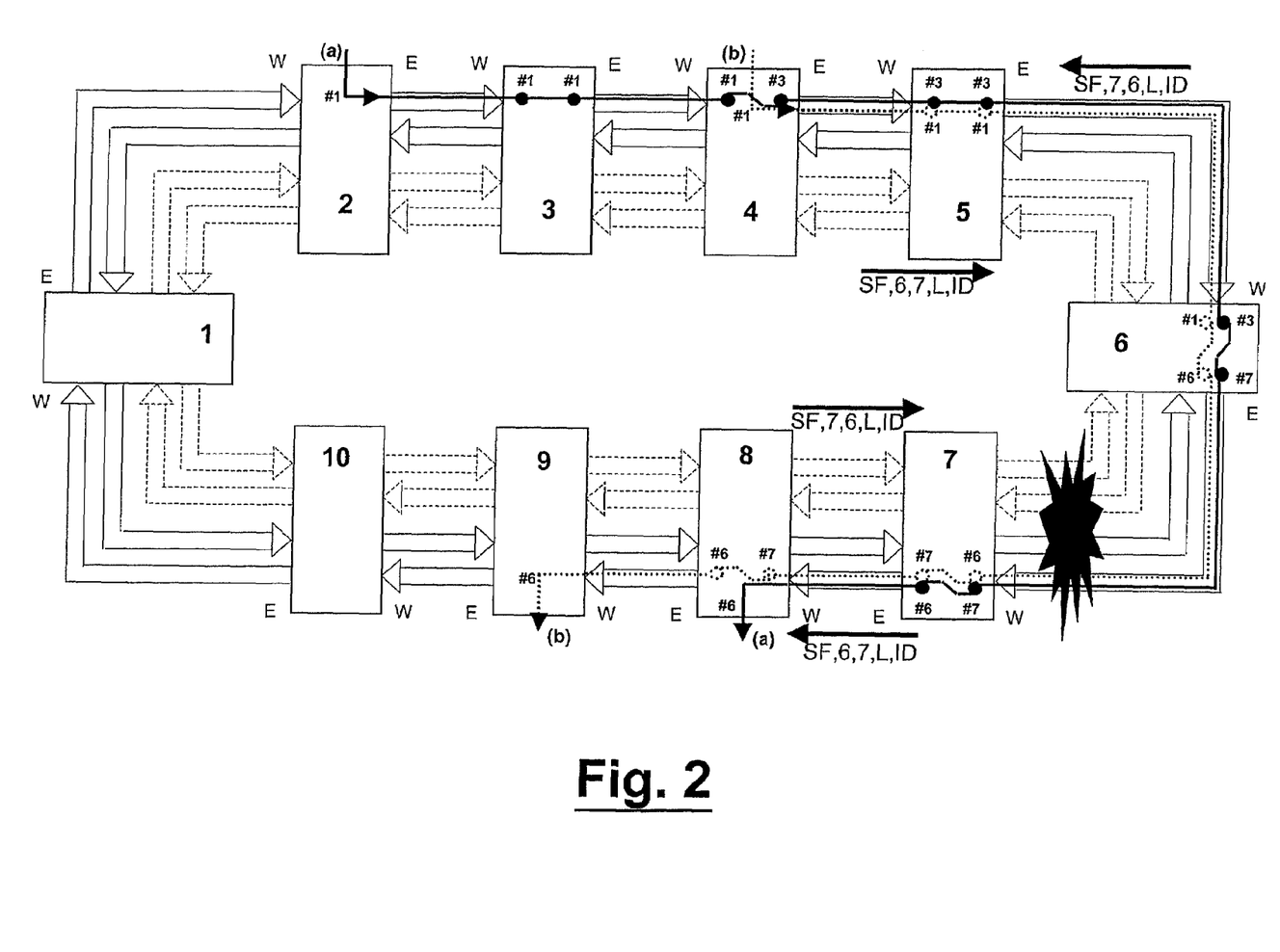
FIG. 2 shows the same ring network of FIG. 1 just after a ring failure took place.
Figure 3:
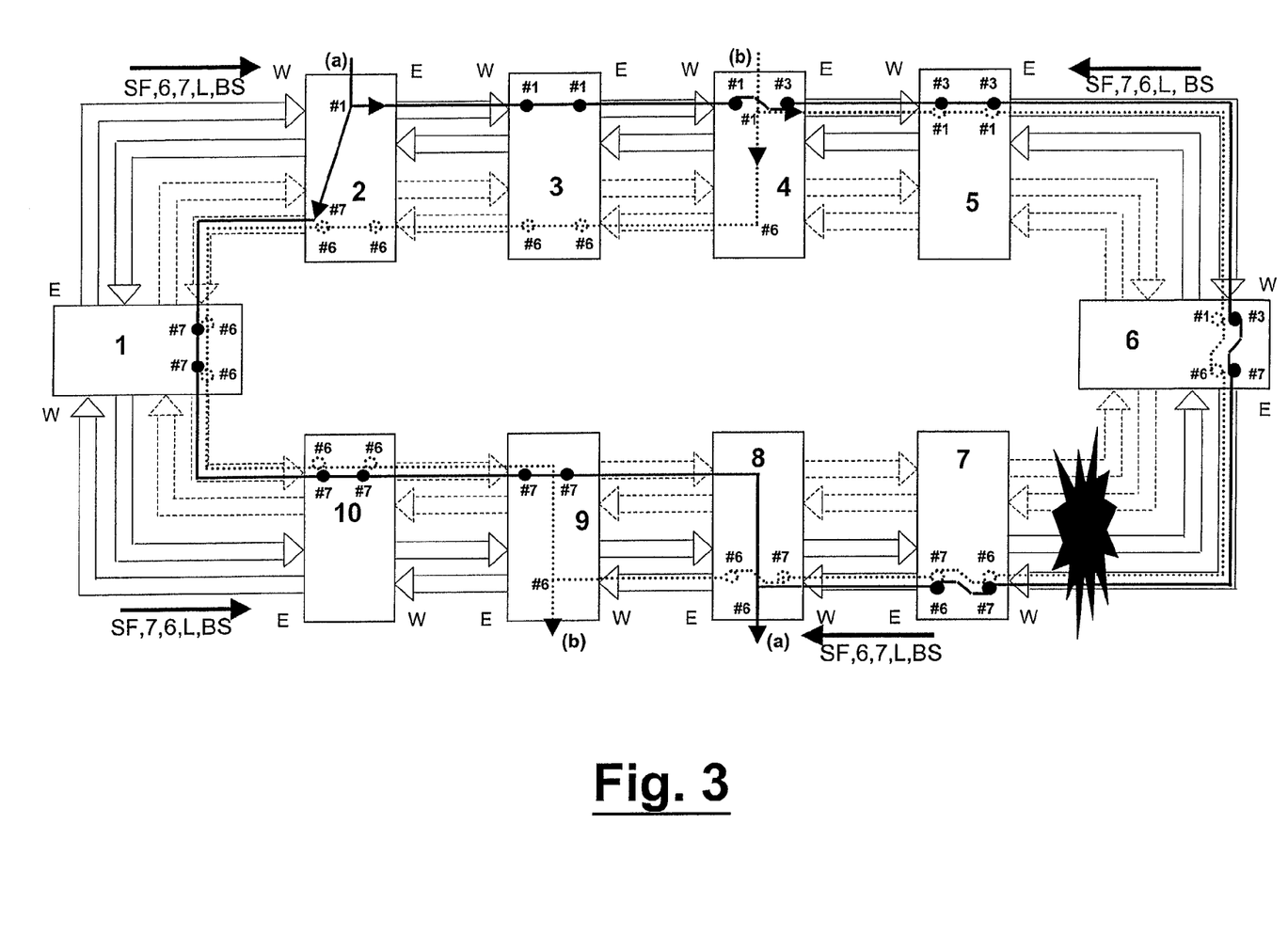
FIG. 3 shows the ring network of FIG. 2 in a stable situation with a ring failure.
Figure 41:
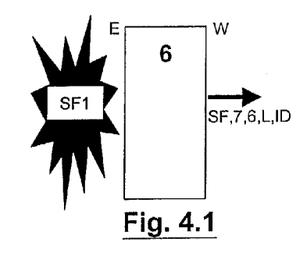
Figure 42:
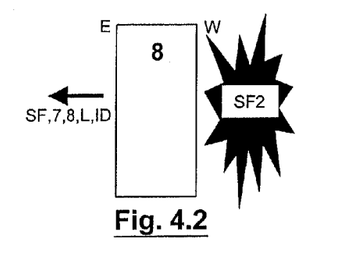

In the event of a failure, the nodes (6 and 7) that are adjacent to the failure will send, as usual, proper failure signaling in the direction opposite to the failure. The structure of the request (APS signaling) is the following: Bridge Request, Destination Node ID, Source Node ID, Type of Path, Protection Status. In this instance, the node 6 will send a signaling of the type SF,7,6,L,ID (Signal Fail, Destination Node: 7, Source Node: 6, Path: Long, Protection Status: Idle) to indicate that a ring failure occurred at span 6-7 and that no action has been taken for the time being. Node 7 will do the same by sending a signaling type SF,6,7,L,ID from its East side (E).

Such signaling will travel down the ring in opposite directions and will be received by termination nodes (2, 8; 4, 9) of paths (a) and (b) that will perform the requested Bridge and Switch (BR & SW) by utilizing the LP channels. In accordance with the present invention, the ring protection (BR&SW and pass-through), in the event of single ring failure, is performed by squelching the terminations of LP traffic allocated on the AU-4s corresponding to the failed span and by allocating the HP traffic on such AU-4s. With reference to FIG. 3, since in span 6-7 the path (a) was allocated on the HP AU-4#7 and the path (b) was allocated on the HP AU-4#6, the allocation AU-4#7 (of the LP channels) will be utilized for the first path and the allocation AU-4#6 (of the LP channels) will be utilized for the second path.

Should TSI be configured also on low-priority traffic, the high-priority traffic protection that requires the use of one of the LP channels utilized in the low-priority TSI, will anyway result in the squelching action on both the low-priority traffic terminations.

Once a node adjacent to the failure has received the signaling sent by its homologous opposite side, with Protection Status corresponding to "Idle", the node itself will send a modified signaling (with Protection Status =Bridged & Switched, BS). In other words, node 6 will send SF,7,6,L,BS from its West side whereas node 7 will send SF,6,7,L,BS from its East side. Upon restoration of the full ring functionality (fault clearing) the BR&SW will be removed and the failure signaling (SF,7,6,L,BS and SF,6,7,L,BS) will be removed.

The present invention, in addition to the single failure event illustrated above, provides for a traffic protection method applicable to multiple failures leading to isolation of one or more nodes in which the TSI of the installed path/s is configured. Within this context three failure scenarios are considered and separately described: in the first scenario the failures occur simultaneously, in the second scenario the failures occur nearly simultaneously while in the third scenario the failures occur at different times.

Referring initially to FIG. 4, consider the case where two failures (SF1 and SF2) occur exactly at the same time instant. For simplicity, paths (a) and (b) before the occurrence of the failures, are allocated in a manner similar to what described for FIG. 1 and therefore the description of the allocations will not be repeated here. Upon the occurrence of the first failure (SF1) on the span 6-7, the node 6 (FIG. 4.1) will send a failure signaling (SF,7,6,L,ID) from the West side whereas, upon the second failure (SF2) on the span 7-8, node 8 will send a simultaneous failure signaling (SF,7,8,L,ID) from the East side (FIG. 4.2).

At the time when each of the two signaling with "Idle" code, which were generated by the switching nodes, is received by the termination nodes of the paths to be protected, squelching of the local termination (if any) of the LP channel corresponding to the HP channel allocated in the failed span to which the signaling is referred, takes place; while, at the nodes designed to realize the pass-through of the LP channels, the squelching of the local termination (if any) of the LP channel corresponding to the HP channel allocated in the failed span to which the signaling is referred takes place and the subsequent pass-through connection also takes place. The actions just described (squelching and squelching+pass-through) are removed both from the path termination nodes and from the pass-through nodes, as soon as such nodes receive the second signaling generated by the switching nodes.

Figure 43:
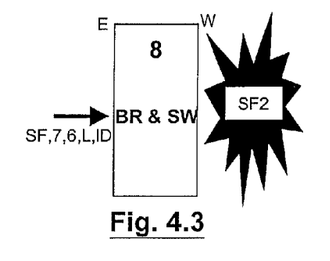
Figure 44:
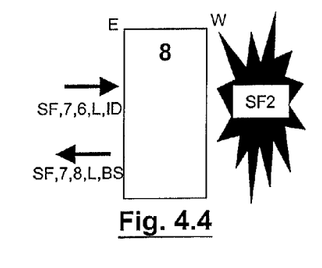
Figure 45:
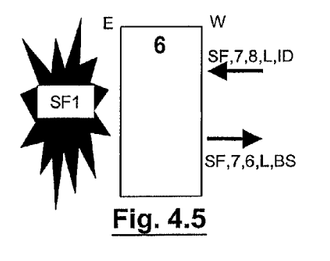
Figure 51:
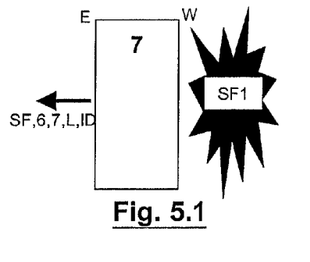
Figure 52:
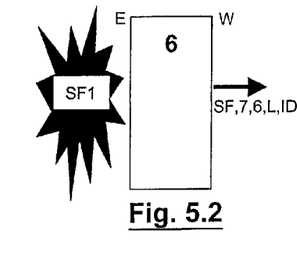
Figure 53:
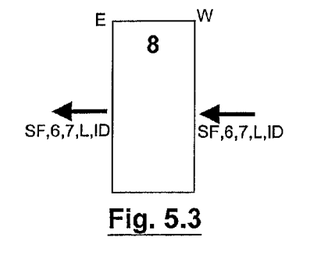
Figure 54:
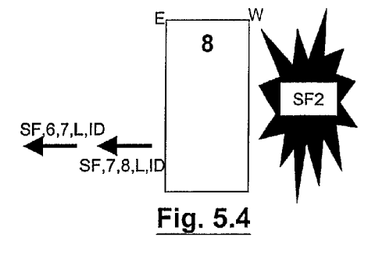

When (FIG. 4.3) the signaling (SF,7,6,L,ID) containing the "Idle" code of SF1 reaches node 8, node 8 (FIG. 4.4) will send a signaling containing BR&SW (BS) Status Code of the type SF,7,8,L,BS. The same will be for node 6 (FIG. 4.5): as soon as it receives signaling (SF,7,8,L,ID) containing the "Idle" code of SF2, it will send a signaling containing BR&SW Status Code (BS) of the type SF,7,6,L,BS.

At the time when one of the two signalings with BS code generated by switching nodes is received by the termination nodes of the HP paths to be protected, the squelching of the local termination (if any) of the LP channel to be used for the protection, that was chosen according to one of the criteria described above, takes place; while, at the nodes designed to realize the pass-through of the LP channels, the squelching of the local termination (if any) of the same LP channel will take place and also the subsequent pass-through connection, will take place.

The Bridge & Switch action that is performed on the LP channel chosen according to the same criterion as above, is performed by every termination node of the HP paths to be protected, as soon as both signalings with BS Code (SF,7, 6,L,BS and SF,7,8,L,BS) are detected at the two sides of the node itself.

Thus, a stable state of the protected ring has been achieved.

Referring initially to FIG. 5, consider the case where two failures (SF1 and SF2) occur nearly at the same time instant (or anyway failure SF2 occurs before the situation following SF1 is stabilized). For simplicity, paths (a) and (b) before the occurrence of the failures, are allocated similarly to what described for FIG. 1 and therefore the description of the allocations will not be repeated here. Upon the occurrence of the first failure (SF1) in span 6-7, the node 6 will send a failure signaling (SF,7,6,L,ID) from the West side and, similarly, it will send another failure signaling (SF,6,7,L,ID) from East side. See FIGS. 5.1 and 5.2, Suppose (FIG. 5.3) that the failure signaling (SF,6,7,L,ID) from the East side is able to reach node 8 before the second failure (SF2) occurs in span 7-8, which results in node 7 isolated. Upon the second failure (SF2), node 8 (node adjacent to the failure) will send a corresponding failure signaling (SF,7,8,L,ID) from its East side. Anyway, the signaling of the second failure will follow the first failure one (FIG. 5.4).

Figure 55:
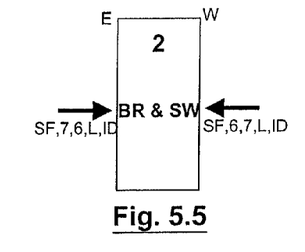
Figure 56:
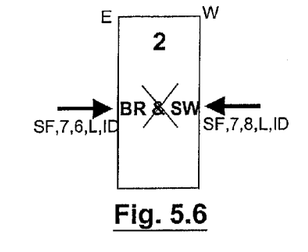

As soon as the signaling (SF,6,7,L,ID; SF,7,6,L,ID) containing the "Idle" code of the first failure reach the termination node 2 (FIG. 5.5) of path (a), this node will perform the BR&SW action by utilizing the LP AU-4 corresponding to the span affected by the first failure (LP AU-4#7, in this instance). However, as soon as also the new signaling (SF,7,8,L,ID) of the second failure (SF2) reaches node 2, the BR&SW action, just realized, is removed (FIG. 5.6).

Figure 57:
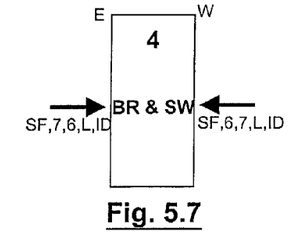
Figure 58:
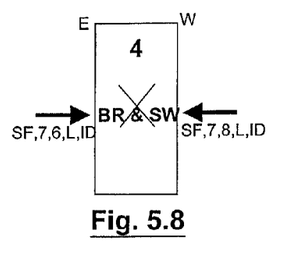

Analogously (FIG. 5.7), as soon as the signaling (SF,6,7, L,ID; SF,7,6,L,ID) containing the "Idle" code of the first failure reach the termination node 4 of the path (b), this node will perform the BR&SW action by utilizing the LP AU-4 corresponding to the span affected by the first failure (LP AU-4#6 in this case). However, as soon as also the new signaling (SF,7,8,L,ID) relating to the second failure (SF2) reaches node 4, the BR&SW action, just realized, is removed (FIG. 5.8).

Obviously, the actions to be taken before the just described temporary BR&SWs are the squelching of the local termination (if any) of the LP channel associated with the span 6-7 both on the termination nodes of the paths to be protected, and on the nodes designed to realize the pass-through, as well as the pass-through connection of the LP channel itself: in order a node to perform such actions, the reception of at least one of the two signaling with "Idle" code generated by the switching nodes is enough to the interested node.

Figure 59:
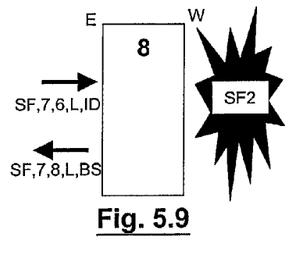
Figure 510:
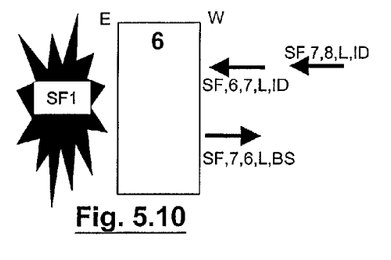

At the same time, when the signaling (SF,7,6,L,ID) containing the "Idle" code of the first failure reaches node 8, node 8 will send a signaling containing the BR&SW (BS) status code of the type SF,7,8,L,BS (FIG. 5.9). The same will be for node 6: as soon as it receives the signaling (SF,6,7, L,ID) containing the "Idle" code of the first failure, it will send a signaling containing the BR&SW (BS) Status Code of the type SF,7,6,L,BS (FIG. 5.10).

Figure 511:
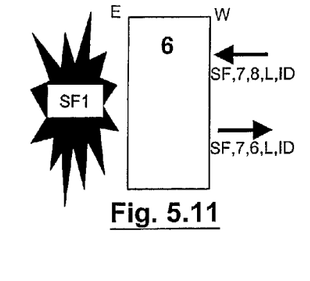

Because of the presence of the new signaling (SF,7,8,L, ID) concerning the second failure (SF2), node 6 will change again its signaling from SF,7,6,L,BS to SF,7,6,L,ID (FIG. 5.11).

At this stage both the signaling transmitted by node 8 containing the BR&SW Status Code and the two consecutive signaling transmitted by node 6 respectively containing the BS&SW (BS) and the "Idle" status codes are present in the ring. The signaling containing the BS Status Code result, at the nodes detecting them, in the squelching of the local termination (if any) of the LP channel chosen for the protection according to one of the aforesaid criteria (for instance the LP channel corresponding to the allocation used in the span affected by the first failure, AU-4#6), as well as in the pass-through of such LP channel at the nodes designed to perform such a function. It is to be noted that, among the two signaling that consecutively emitted by node 6, the one containing "Idle" code does not remove the squelching and pass-through actions activated by the previous signaling (with BS code), since both refer to the same failed span: SF,7,6,L,BS and SF,7,6,L,ID.

Figure 512:
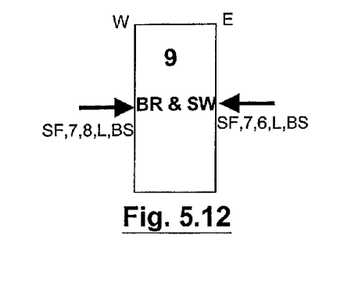
Figure 513:
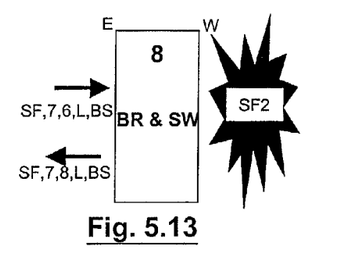

The node 9 (FIG. 5.12), receiving a signaling with BS code (SF,7,6,L,BS and SF,7,8,L,BS) from both its W and E sides, will perform the BR&SW action by utilizing the LP allocation related to one of the failured spans, for instance the one affected by the first failure (AU-4#6). Node 8, that receives the signaling containing the BS code (SF,7,6,L,BS) previously sent to it by node 6, will realize the BR&SW action (FIG. 5.13) by utilizing the LP allocation related to one of the failured spans, for instance the one affected by the first failure (AU-4#7). Some of the possible selection criteria have been mentioned above.

Figure 514:
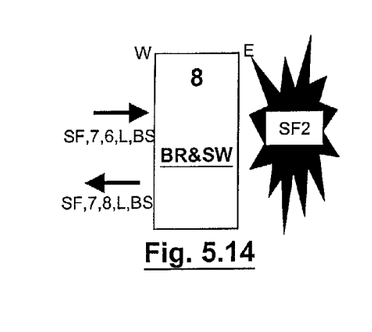

Since the request that reaches both node 9 and node 8 with "Idle" code, is related to the failured span already indicated in the preceding request (SF,7,6,L,BS), the BR&SW action is maintained (FIG. 5.14).

Figure 515:
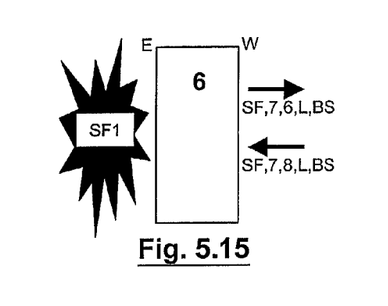

When the request related to the second failure (SF2) and containing the BS code reaches node 6, the APS signaling is updated with the BS code, namely node 6 will send, from side W, the signaling SF,7,6,L,BS (FIG. 5.15).

Node 4, as soon as it receives signaling with BS code from both sides, will realize the BR&SW action by utilizing the LP allocation related to one of the spans affected by a failure, for instance the one affected by the first failure (AU-4#6).

Figure 516:
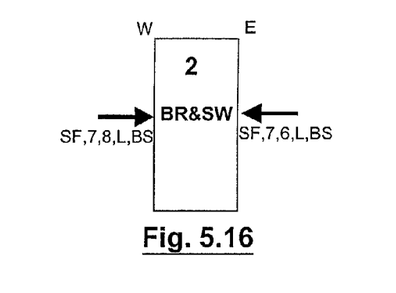
Figure 517:
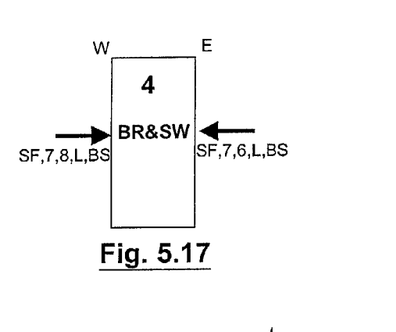

Lastly, the node 2, as soon as it receives, from both its W and E sides, a signaling with BS code (SF,7,6,L,BS and SF,7,8,L,BS), will perform the BR&SW action (FIG. 5.16) by utilizing the LP allocation related to one of the spans affected by a failure, for instance the one affected by the first failure (AU-4#7).

Thus, a stable state in the protected ring is obtained.

As said above, the scenario of the actions taken by the various nodes is different in the case where the failures do not occur at the same time. In this connection, two different sub-scenarios should be distinguished. With reference to FIGS. 1 to 3 and 6, the actions and the consequences related to the first sub-scenario are schematically listed below starting from a situation free of faults.

The first failure (SF1) occurs. The node 6 sends SF,7,6, L,ID from the W side. The node 7 sends SF,6,7,L,ID from the side E (FIG. 2).

SF,7,6,L,ID and SF,6,7,L,ID reach the termination nodes of paths (a) and (b). The termination nodes perform the BR&SW action for each path to be protected by utilizing the corresponding LP channels of the span affected by SF1. Path (a) is allocated on LP AU-4#7. Path (b) is allocated on LP AU-4#6 (FIG. 3).

The nodes 6 and 7 adjacent to the failure SF1 send respective signaling with BS code (SF,7,6,L,BS and SF,6,7, L,BS) and a stable scenario of ring protected against SF1 is obtained (FIG. 3).

Figure 61:
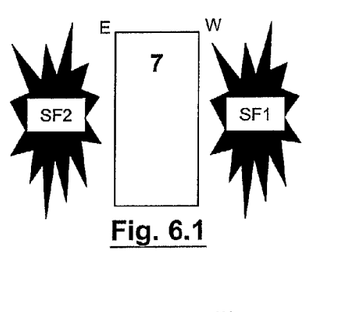
Figure 62:
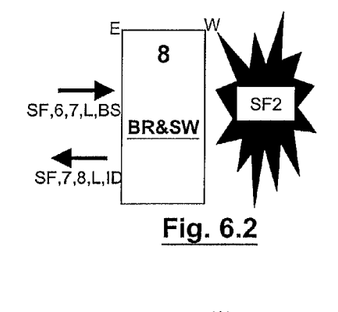
Figure 63:
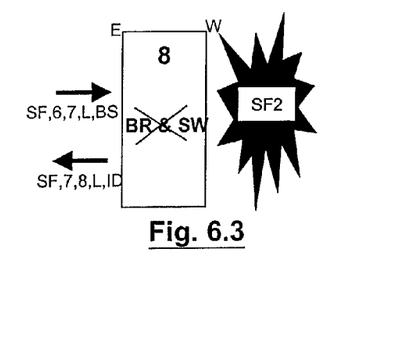
Figure 64:
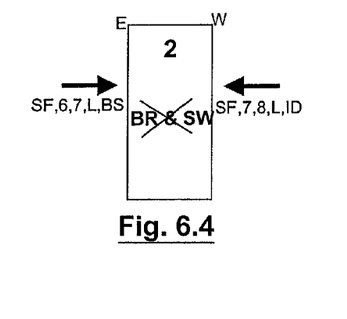
Figure 65:
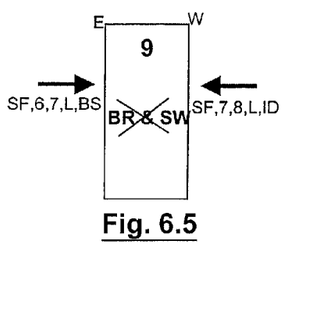
Figure 66:
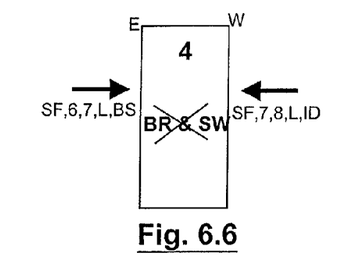

SF2 occurs on span 7-8: node 7 is isolated (FIG. 6.1). Node 8 sends SF,7,8,L,ID from the side E (FIG. 6.2).

The BR&SW action (both the BR&SW and the pass-through at the intermediate nodes) performed for path (a) is removed (FIGS. 6.3 and 6.4). The BR&SW action (both the BS&SW and the pass-through at the intermediate nodes) performed for path (b) is removed (FIGS. 6.5 and 6.6).

Figure 67:
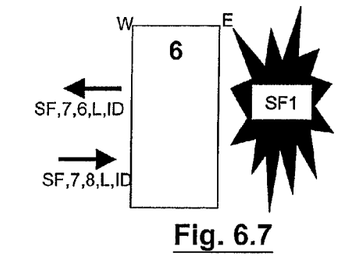

Node 6 receives the signaling SF,7,8,L,ID and sends SF,7,6,L,ID (FIG. 6.7).

Figure 68:
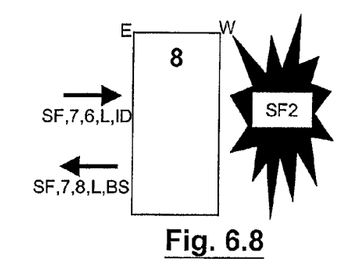

The node 8 receives from node 6 the signaling SF,7,6,L, ID and sends SF,7,8,L,BS (FIG. 6.8).

Figure 69:
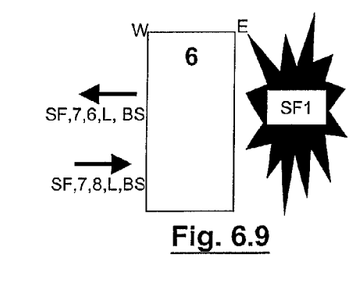

Node 6 receives the signaling SF,7,8,L,BS and sends SF,7,6,L,BS (FIG. 6.9).

Figure 610:
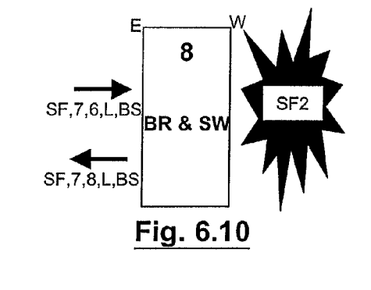
Figure 611:
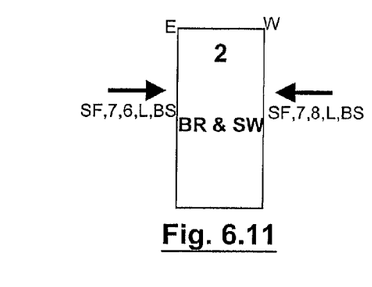

Nodes 2 and 8 receive the signaling SF,7,8,L,BS and SF7,6,L,BS and perform the BR&SW action by utilizing for instance the LP channels with AU-4 corresponding to that of the first failed span (LP AU-4#7). The scenario becomes stable for the path (a) (FIGS. 6.10 and 6.11).

Figure 612:
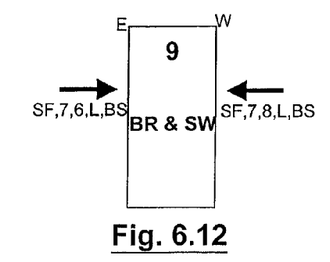
Figure 613:
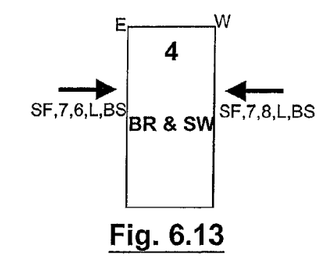
Figure 810:
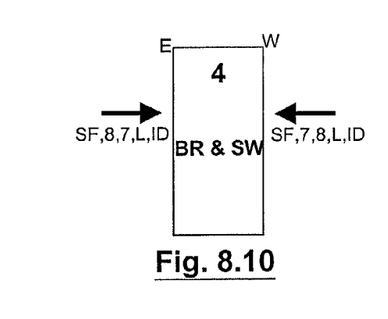

Nodes 4 and 9 receive the signaling SF,7,8,L,BS and SF,7,6,L,BS and perform the BR&SW action by utilizing for instance the LP channels with AU-4 corresponding to the one of the first failed span (LP AU-4#6). The scenario becomes stable for path (b) (FIGS. 6.12, 6.13).

The squelching actions of the local termination (if any) of the LP channel chosen for the protection according to one of the criteria already described and the subsequent pass-through of the same LP channel at the intermediate nodes come before the BR&SW actions just described and are performed with the rules already pointed out for the two previous scenarios.

With reference to FIGS. 1 to 3 and 7, the actions and the consequences related to the second sub-scenario of double failure at different times will now be schematically listed in the following, still starting from a faultless situation.

The first failure (SF1) occurs. Node 6 sends SF,7,6,L,ID from the W side. Node 7 sends SF,6,7,L,ID from the E side (FIG. 1).

SF,7,6,L,ID and SF,6,7,L,ID reach the termination nodes of the paths (a) and (b). The termination nodes perform the BR&SW action for each path to be protected by utilizing the corresponding LP channels of the span affected by SF1. The path (a) is allocated on LP AU-4#7. The path (b) is allocated on LP AU-4#6 (FIG. 2).

The nodes 6 and 7 adjacent to failure SF1 receive the signaling with ID code (SF,7,6,L,ID and SF,6,7,L,ID), send respective signaling with BS code (SF,7,6,L,BS and SF,6,7, L,BS) and a stable scenario of ring protected against SF1 is obtained (FIG. 3).

Figure 71:
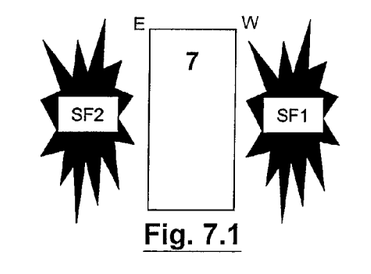
Figure 72:
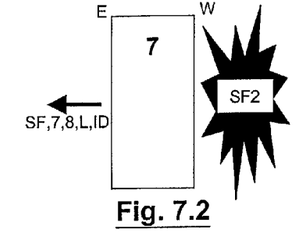

SF2 occurs in span 7-8: node 7 is isolated (FIG. 7.1). Node 8 sends SF,7,8,L,ID from the E side (FIG. 7.2).

Figure 73:
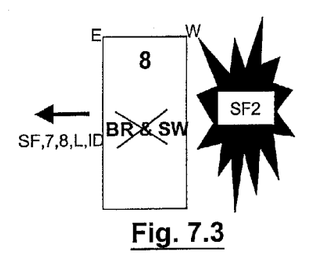

The node 8, as a node adjacent to the failure and as a termination node, evaluates whether the already protected paths can still be protected. In the affirmative, no action is taken; in the negative, the BR&SW action is removed (FIG. 7.3).

Figure 74:
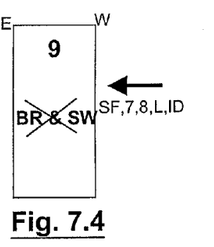

Node 9 receives the SF,7,8,L,ID request and evaluates whether the already protected paths can still be protected. In the affirmative, no action is taken; in the negative, the BR&SW action is removed (FIG. 7.4).

Figure 75:
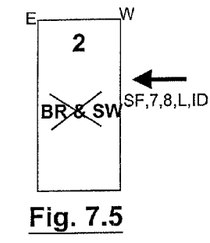

Node 2 receives the SF,7,8,L,ID request and evaluates whether the already protected paths can still be protected. In the affirmative, no action is taken; in the negative, the BR&SW action is removed (FIG. 7.5).

Figure 76:
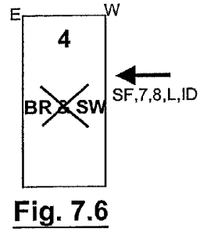

Node 4 receives the SF,7,8,L,ID request and evaluates whether the already protected paths can still be protected. If yes, no action is taken; if not, the BR&SW action is removed (FIG. 7.6).

As soon as node 6 receives the SF,7,8,L,ID signaling, it updates its request by inserting the "Idle" status code, of the type SF,7,6,L,ID. After a further signaling exchange, the nodes adjacent to the failure update the respective signaling by inserting "BR&SW" (BS) status code.

At this point only signaling with BS code are traveling in the ring that is failured by SF1 and SF2 and therefore a stable scenario for paths (a) and (b) towards the failures SF1 and SF2 has been achieved.

It will be recognized that the first sub-scenario results in a rather simple implementation since it is not necessary to store the failure "history" but, at the same time, traffic is not safeguarded in an optimal manner because the BR&SW is always removed. On the contrary, the second sub-scenario safeguards the traffic in a better manner but it is more difficult to be implemented because the traffic "history" shall be stored.

Having analyzed in detail the single-failure and the double-failure situations (simultaneous, nearly simultaneous or at different times), we will go on in describing schematically the actions that each network node must perform (and the corresponding consequences) when the failures are cleared and the ring functionality is restored.

Figure 81:
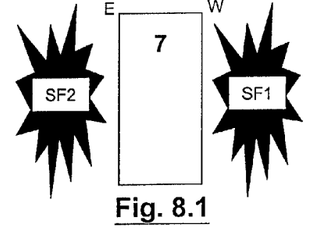
Figure 82:
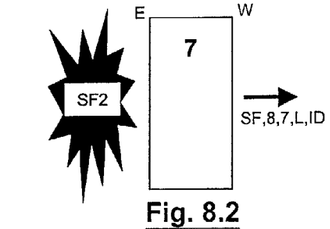

Start from a stable situation of two failures SF1, SF2: in this situation, node 7 is isolated (FIG. 8.1) and only signalings with BS code (SF,7,8,L,BS and SF,7,6,L,BS) are traveling in the ring. Consider to clear first SF1: the node 7, no longer isolated, begins to send the APS signaling with "Idle" code related to the span affected by a failure (SF2) still present between the nodes 8 and 7 (SF,8,7,L,ID) (FIG. 8.2).

Figure 83:
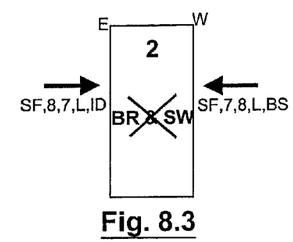
Figure 84:
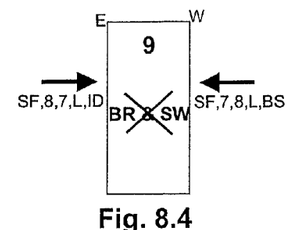
Figure 85:
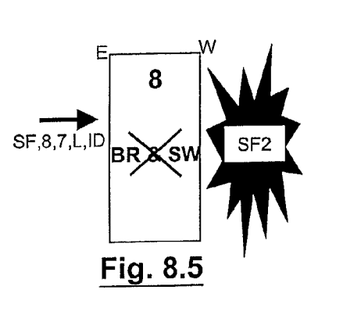
Figure 86:
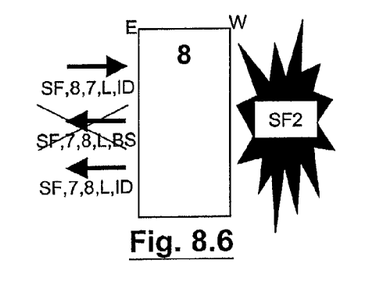
Figure 87:
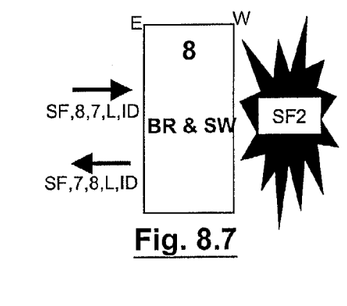
Figure 88:
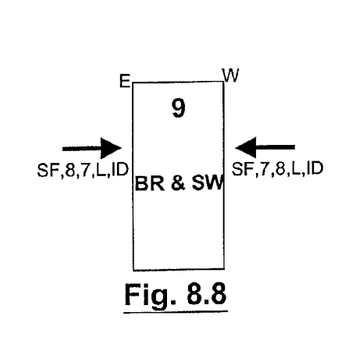
Figure 89:
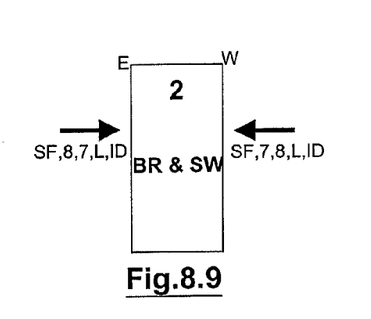

Since the LP allocation of the span 7-6 had been chosen, the BR&SW (and squelching of the any local termination of the LP channel utilized) action at node 4 must be removed. Similarly, as soon as also the SF,8,7,L,ID signaling reaches the other path termination nodes (2, 9, 8), the BR&SW and any local squelching action is removed also at such nodes 2, 9, 8 (FIGS. 8.3 to 8.5). The removal of "BR&SW" at the termination nodes is accompanied by the removal of the pass-through (and of any local squelching) from the intermediate nodes that have performed the pass-through of the LP channel heretofore utilized for the protection. Since the signalings present at the intermediate nodes are related to the same span affected by a failure, such nodes can perform, if required, the pass-through of the LP channels, related to the current failure, to be utilized for the path protection.

The node 8, as a node adjacent to the failure SF2, receives SF,8,7,L,ID and changes the code of its signaling from SF,7,8,L,BS to SF,7,8,L,ID (FIG. 8.6). Such signaling with ID code gradually reaches all the termination nodes (9, 2, 4) showing them in this way that a single failure (SF2) is present. The termination nodes in turn will execute the BR&SW action (FIGS. 8.8 to 8.10) by utilizing the LP channels that correspond to the failured span (for path (a) the LP AU-4#6 will be utilized, for path (b) the LP AU-4#7 will be utilized).

Figure 811:
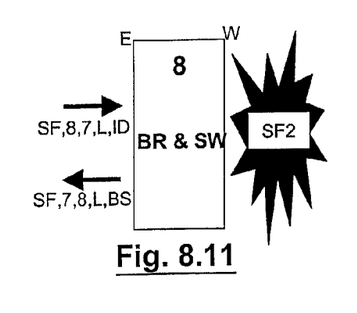
Figure 812:
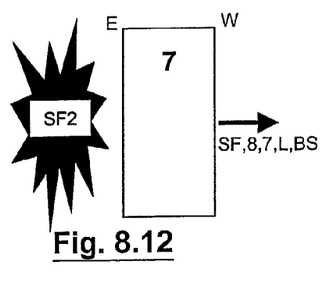

The nodes (7, 8) adjacent to the failure still present (SF2) will send corresponding signaling with BS code (SF,8,7,L, BS and SF,7,8,L,BS) and a single-failure stable condition will be achieved (FIGS. 8.11, 8.12).

Figure 813:
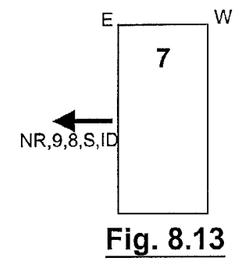
Figure 814:
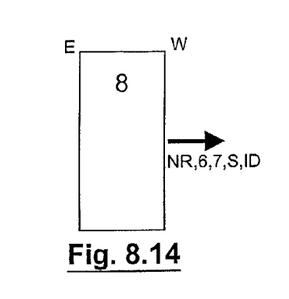

As soon as also SF2 is cleared, the ring will reach the faultless stable condition (FIGS. 8.13, 8.14), with the progressive removal of the "Bridge" and "Switch" actions from all the path termination nodes and the consequent signalings with "No Request, Idle" code (NR,9,8,S,ID and NR,6,7,S, ID) by all the ring nodes, including nodes (7, 8) adjacent to the just cleared failure (SF2).

Figure 91:
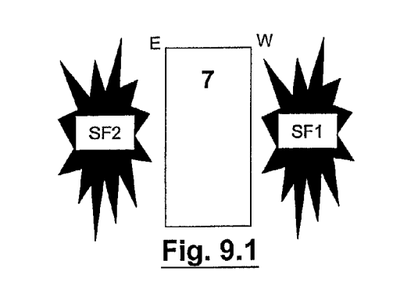
Figure 92:
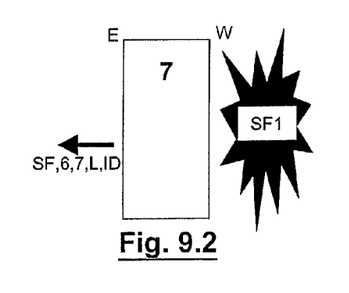
Figure 93:
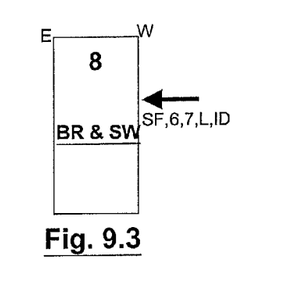
Figure 94:
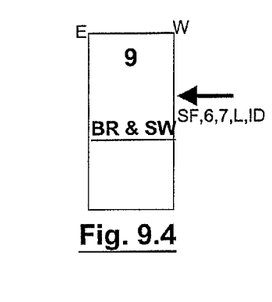
Figure 95:
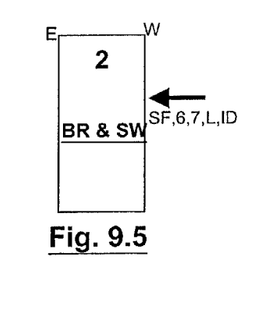
Figure 96:
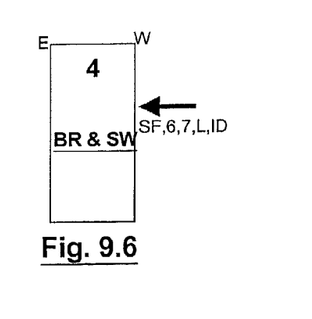

Start now from a stable situation of two failures SF1, SF2 (FIG. 9.1): in this situation node 7 is isolated and only signalings with BS code (SF,7,8,L,BS and SF,7,6,L,BS) are traveling in the ring. Consider to clear SF2 first: node 7 (FIG. 9.2), no longer isolated, begins to send the APS signaling with "Idle" code (SF,6,7,L,ID) related to the span affected by failure (SF1) still present between nodes 6 and 7.

Since just the LP allocation of the span 7-6 had been chosen, the BR&SW action at node 8 can be maintained (FIG. 9.3). Similarly, the SF,6,7,L,ID signaling reaches the other path termination nodes (9, 2, 4) but the BR&SW action is maintained also at such nodes 9, 2, 4 (FIGS. 9.4 to 9.6).

The same processing is carried out at intermediate nodes that perform the pass-through of the LP channels used for the protection: the pass-through is maintained.

Finally, also node 6 adjacent to the failure SF1 receives SF,6,7,L,ID and will send the corresponding signaling with ID code (SF,7,6,L,ID), reaching a stable scenario with "BS" signalings all over the ring.

Figure 97:
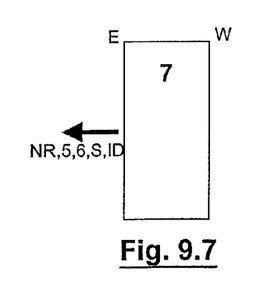
Figure 98:
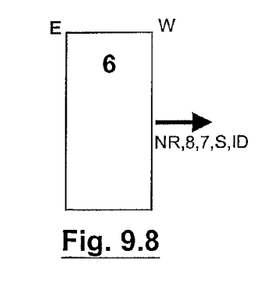

As soon as also SF1 is cleared, the ring will reach the faultless stable condition, with the progressive removal of the "Bridge" and "Switch" actions from all the path termination nodes and the consequent signaling with "No Request, Idle" code (NR,5,6,S,ID and NR,8,7,S,ID) issued by all the ring nodes, including nodes (6, 7) adjacent to the just cleared failure (SF2). See FIGS. 9.7 and 9.8.

In view of the above detailed description, relating to some cases of single or double failure, the person skilled in the art can easily devise the actions that every node must perform in the event of a failure on other spans and/or in the case where more than two failures occur. Naturally, the present invention is applicable to all these cases and its scope covers all these cases and is limited only by the following claims.

As far as the practical realization is concerned, it will be understood that all the actions performed by every node or network element are the known Pass-Through, Bridge and Switch, squelching of any terminations of the Low-Priority channels involved in the protection and transmission of signaling, substantially of known type, actions. Therefore, the implementation of the present method does not require to change the physical structure of the existing network elements used in ring networks protected against possible failures. Any modifications must be carried out at level of consequent actions performed by the nodes affected by the protection mechanism, according to signalings already provided for and present in the standardized protocol and on the ground of ring map information, already provided for and processed, as well as traffic map that carries the allocation time-slot information, in every ring span of the single path that is installed.

Finally it is pointed out that, although the present invention has been described in detail with reference to SDH synchronous transmission, it applies, in similar manner, to other types of synchronous transmission, typically SONET. The fact that this type of signals has not been taken into account in the description shall not be interpreted as a limitation but merely as an example and in order to render the description clear. Therefore, for the purposes of the present description and of the annexed claims, the terminology used for SDH transmissions will include at least the corresponding SONET terminology and shall be read in this perspective.

What is claimed is:

1. A method of re-routing a path installed in a transoceanic Multiplex Section Shared Protection Ring network in the event of a first failure on a first span of said path, said network comprising network elements connected in a ring configuration by fiber spans, said fiber spans comprising high priority channels and low priority channels, said method comprising:
performing a ring switch action by a Multiplex Section Shared Protection mechanism;
providing said ring with a Time Slot Interchange mechanism; and
re-routing the path over a time slot of the low-priority channels corresponding to a time slot of the high-priority channels of the first span having the first failure; and
wherein a second span of the path becomes affected by a second failure, further comprising:
releasing the re-routing performed because of the first failure on the first span;
selecting one of the first and second spans; and
re-routing the path over a time slot of the low priority channels corresponding to a time slot of the high priority channels of the first or second span that has been selected.

2. A method according to claim 1, wherein a second span becomes affected by a second failure, further comprising maintaining the re-routing, performed because of the first failure on the first span, when persistency of re-routing information is supported by the network elements of the ring network.

3. A method according to claim 1, wherein the selecting one of the first and second spans comprises:
identifying nodes terminating the path to be protected;
identifying switching nodes; and
considering two spans adjacent to switching nodes able to communicate with termination nodes of the path to be protected, wherein at least one further span of the installed path becomes affected by an additional failure.

4. A method according to claim 1, wherein the selecting of one of the first and second spans comprises:
providing each network node with a node identification ID;
identifying at least one switching node; and
selecting the first or second span adjacent to a switching node having a higher or a lower node identification ID.

5. A method according to claim 1, wherein the selecting of one of the first and second spans comprises:
providing a network ring map;
identifying at least one switching node; and
selecting the first or second span adjacent to a switching node that comes first or last in the network ring map.

6. A method according to claim 1, wherein the selecting of one of the first and second spans comprises:
identifying a west side and an east side in the ring network;
identifying at least one switching node; and
selecting the first or second span adjacent to a far west or a far east switching node in the ring network.

7. A network element of a transoceanic Multiplex Section Shared Protection Ring network, said ring network comprising network elements connected to each other in a ring configuration by fiber spans, said fiber spans comprising high priority channels and low priority channels, said network elements comprising:
means for performing ring switch actions upon receipt of a corresponding signal, wherein said ring switch actions comprise a pass-through action, a bridge action or a switch action; and
means for issuing and sending proper signals upon receipt of corresponding signals,
wherein a path is installed in said ring network,
wherein a time slot interchange mechanism is provided in said ring network,
wherein said network element further comprises means for, in case of a first failure in a first span of the installed path, re-routing the path over a time slot of low priority channels corresponding to a time slot of high priority channels of the first span having the first failure, and wherein a second span of the path becomes affected by a failure, wherein the network element further comprises:

means for releasing the re-routing action performed because of the first span having the first failure;

means for selecting one of the first and second spans; and means for re-routing a path over the time slot of the low priority channels corresponding to the time slot of the high priority channels of the selected first or second span.

8. A network element according to claim 7, wherein a second span of the path is affected by a second failure, further comprising means for maintaining the re-routing action, performed because of the first span having the first failure, when persistency of the re-routing information is supported by the network elements of the ring network.

9. A network element according to claim 7, wherein the path to be protected comprises termination nodes, switching nodes identified because of a failure, and wherein said means for selecting one of the first or second spans having a failure comprise means for considering two spans adjacent to the switching nodes able to communicate with the termination nodes of the path to be protected in the case where at least one further span of the path becomes affected by a failure.

10. A network element according to claim 7, said network element comprises:

a path termination node; and means for performing a Bridge&Switch action upon receipt of two signals comprising corresponding bridge requests with a Bridge&Switch status code related to different spans.

11. A network element according to claim 7, said network element comprises:

a path non-termination node; and means for performing a pass-through action upon receipt of at least one signal comprising a bridge request with a Bridge&Switch status code.

12. A network element according to claim 7, said network element comprises:

a path termination node; and means for performing a Bridge&Switch action upon receipt of two signals comprising corresponding bridge requests with an Idle status code related to the first or second span.

13. Network element according to claim 7, said network element comprising:

a path non-termination node; and means for performing a pass-through action upon receipt of at least one signal comprising a bridge request with an Idle status code.

14. A transoceanic Multiplex Section Shared Protection Ring network comprising:

one or more network elements connected to each other in a ring configuration by fiber spans, said fiber spans comprising high priority channels and low priority channels, said network elements comprising:

means for performing ring switch actions upon receipt of corresponding signals, wherein said ring switch actions comprise a pass-through action, a bridge action or a switch action; and means for issuing and sending proper signals upon receipt of corresponding signals, wherein a path is installed in said ring network, wherein a time slot interchange mechanism is provided in said ring network, and wherein said network elements further comprise:

means for, in case of a failure in a span of the installed path, re-routing the path over a time slot of low priority channels corresponding to a time slot of high priority channels of the span having the failure;

wherein a second span of the path becomes affected by a failure, wherein the network element further comprises:

means for releasing the re-routing action performed because of the first span having the first failure;

means for selecting one of the first and second spans; and means for re-routing a path over the time slot of the low priority channels corresponding to the time slot of the high priority channels of the selected first or second span.

* * * * *